Feb. 4, 1958 W. D. HUSTON 2,821,860
SEALED ACTUATING CONNECTION
Filed July 5, 1955 3 Sheets-Sheet 1
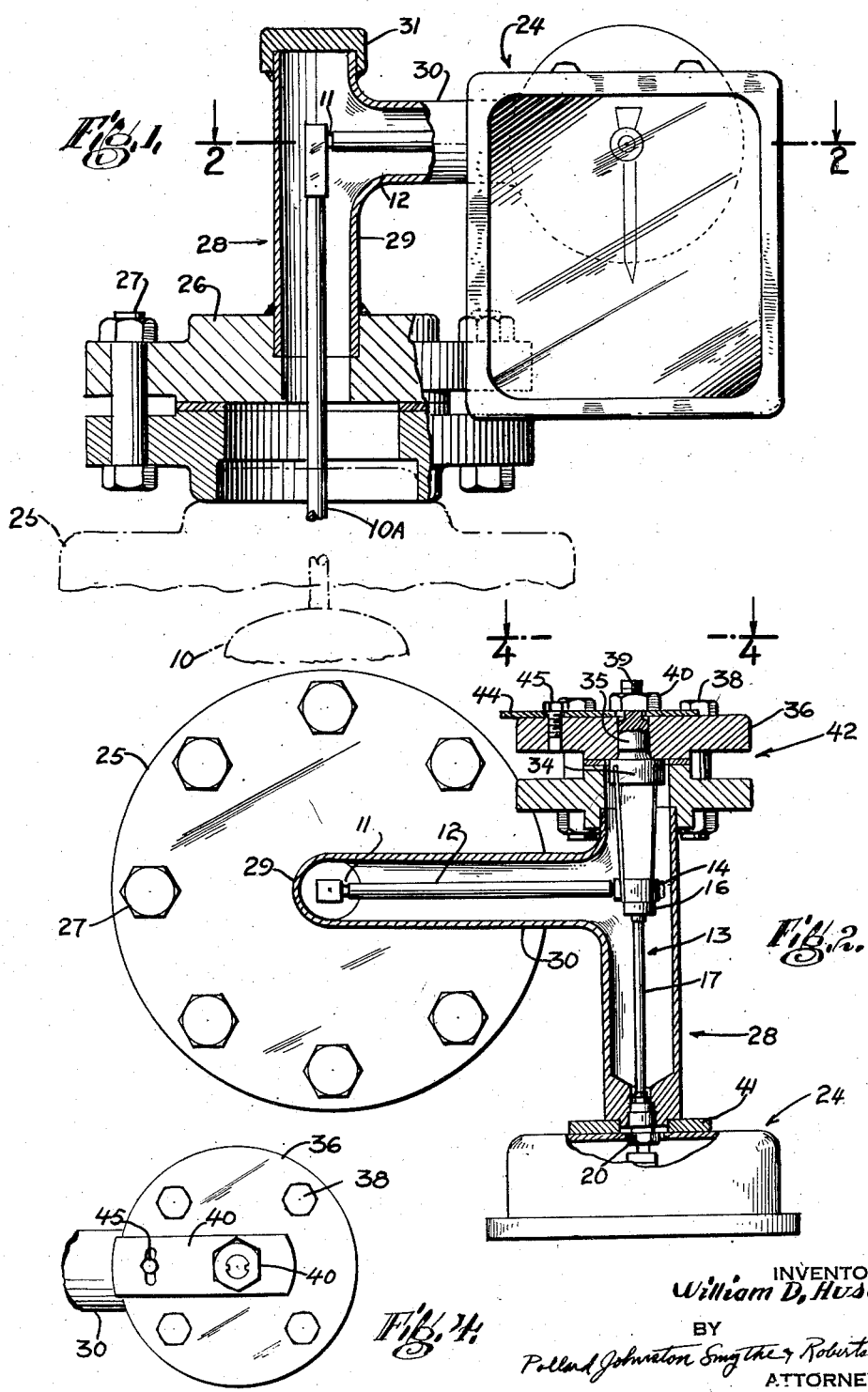
INVENTOR
William D. Huston
BY
Pollard Johnston Smythe & Robertson
ATTORNEYS

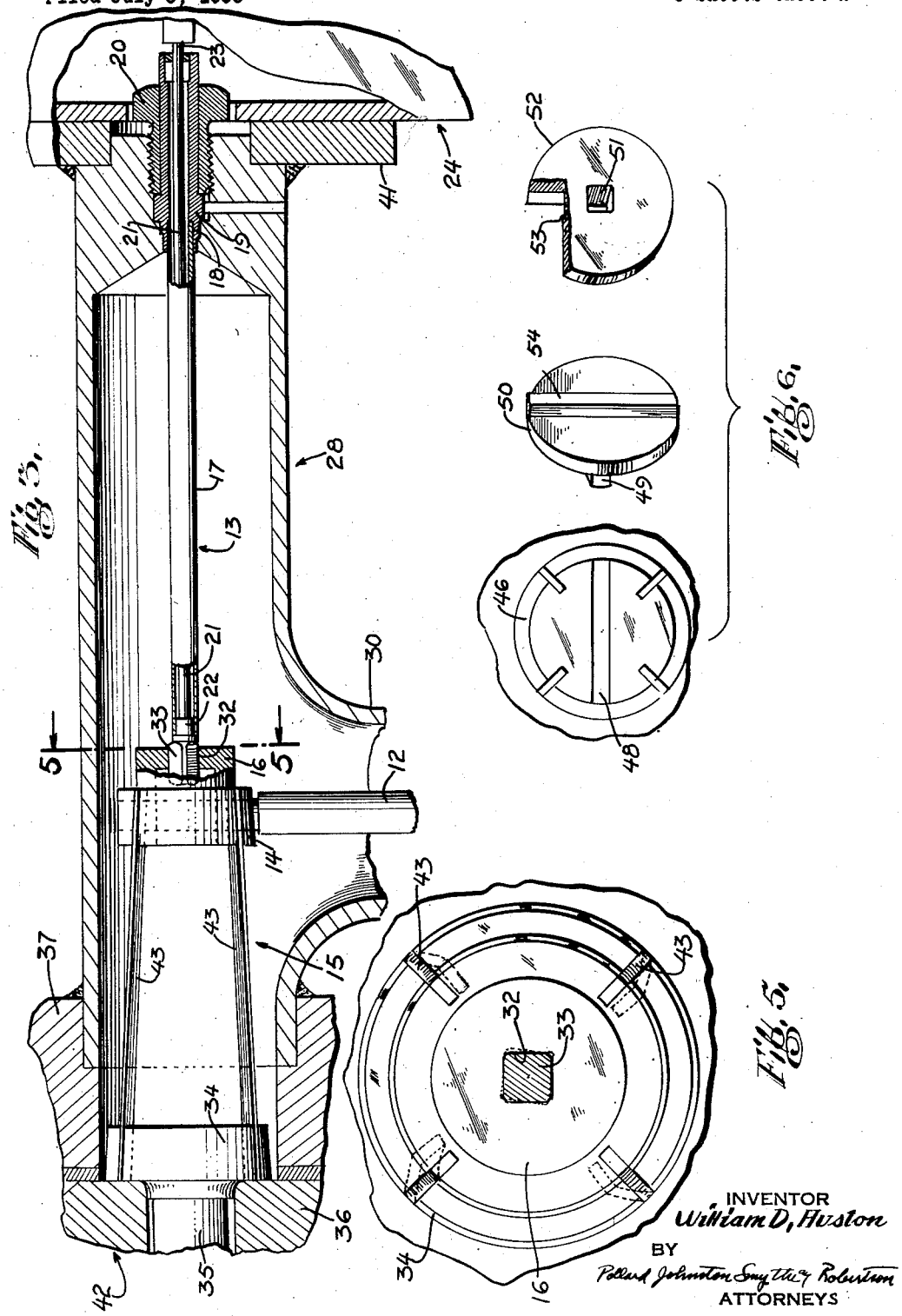

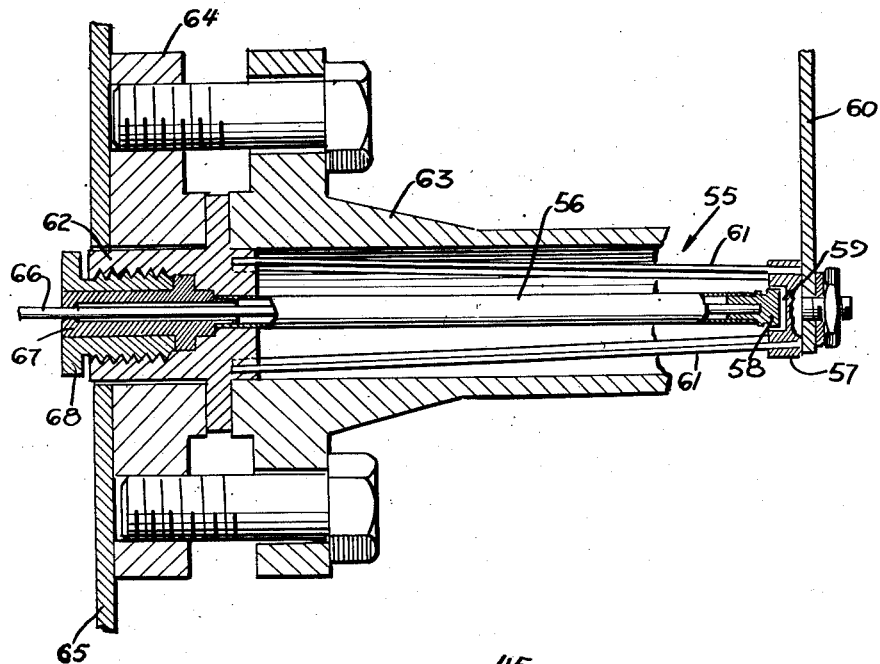
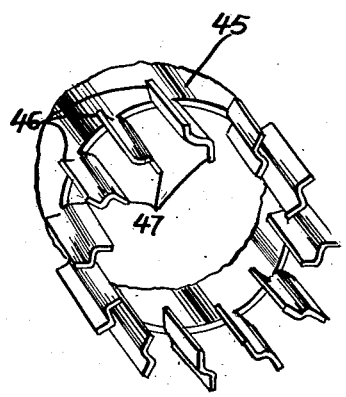

United States Patent Office 2,821,860
Patented Feb. 4, 1958

2,821,860

SEALED ACTUATING CONNECTION

William D. Huston, Sellersville, Pa., assignor to American Machine and Metals, Inc., New York, N. Y., a corporation of Delaware Application July 5, 1955, Serial No. 519,690

11 Claims. (Cl. 74—18)

This invention relates to an instrument actuating mechanism and particularly to one useful in conjunction with a torque tube liquid level displacement type responsive device.

One of the problems in prior devices has been to provide an arrangement suitable for transmitting forces from an actuated mechanism, such as a displacement float or other means, through a sealing arrangement in the side of a vessel or casing to an indicator or controller, the seal not employing packing glands or stuffing boxes. Some of the prior devices have employed knife edge bearings for supporting the parts with consequent undesirable friction and have not been readily adjustable or easily replaceable.

One of the objects of the invention is to provide an improved instrument having simple means for supporting and adjusting the actuating mechanism.

Another object of the invention is to provide a liquid level displacement type instrument employing a torque tube having an improved adjustable motion resisting and tube support means.

In one aspect of the invention, an actuating means, such as a liquid displacement type float, is operatively connected to a torque tube assembly, one end of the torque tube being positively anchored in a frame. A shaft extending through the torque tube is connected to the closed end of said torque tube, the actuating mechanism being connected to the tube adjacent to the connection of the shaft for twisting the tube and rotating the shaft extending therethrough. The outboard end of the shaft can be connected to suitable indicating or controlling means. A cage bearing or rotation resisting and supporting means is connected to said tube at a point spaced from the anchored end of the torque tube, said anchored end of the cage bearing being at a location spaced beyond the torque tube or being at a location which surrounds said tube. The rotation resisting means has flexure strips or members extending longitudinally or axially thereof, these members being separated from each other. In a preferred form, the flexure members are flat, the flat portion extending radially from the longitudinal axis of the rotation resisting means. The flexure members are arranged so that as the torque tube is twisted by change in position or change in buoyancy of the actuating member, they will flex and permit the desired rotation of the shaft yet they will support the torque tube on its axis. The anchored end of the rotation resisting member may be adjustably connected to the casing so as to readily permit accurate angular adjustment thereof and thus the tension and zero point of the instrument.

In an alternate form, the separated strips may be wires or may be formed from a tubular member by slitting and bending the edges of the connecting strips radially. The rotation resisting means may project beyond the torque tube or may surround the same, the anchored end of the rotation resisting means being appropriately located as mentioned.

These and other objects, advantages and features of the invention will become apparent from the accompanying description and drawings which are merely exemplary.

In the drawings:

Fig. 1 is a fragmentary side view partially in section of one form of the invention;

Fig. 2 is a top view of Fig. 1, taken along the line 2—2;

Fig. 3 is an enlarged fragmentary plan view of the torque tube and operating mechanism of Fig. 2;

Fig. 4 is a fragmentary view looking along the line 4—4 of Fig. 2 showing one form of adjusting means;

Fig. 5 is a sectional view taken along the line 5—5 of Fig. 3;

Fig. 6 is an exploded view of a modified form of connection between the torque tube and rotation resisting means;

Fig. 7 is a fragmentary sectional view of another form of the invention;

Fig. 8 is a sectional view of an alternative form of cage bearing.

The invention will be described particularly in conjunction with a liquid level displacement responsive mechanism but it is to be understood that it can be used for other purposes. The displacement device 10, shown schematically in Fig. 1, can take the form of a float connected to suspension rod 10A, rod 10A being connected at 11 to actuating arm 12. Arm 12 is connected to the torque tube assembly 13 (Fig. 2, 3) by bracket 14, said bracket 14 being held on cage bearing or rotating resisting and support means 15. Tip 16 of the cage bearing is separably connected to the torque tube assembly 5. Torque tube 17 may be anchored at 18 to the flange 41 of casing 28 through bushing 19 held in place by screw-threaded socket 20. Rod 21 is fastened at 22 to the end of torque tube 17. End 23 of the rod may be extended and connected to a suitable indicating or controlling mechanism shown generally at 24 (Fig. 1). Housing 25 (Fig. 1) may have the instrument assembly fastened thereto by flange 26 and bolts 27, the housing 25 being in communication with the liquid to be controlled or indicated. L-shaped casing 28 has a vertical portion 29 and a horizontal portion 30, cap 31 providing access thereto.

Rotation resisting or cage bearing tip member 16 may have an aperture 32 therein for removably receiving the end 33 of the end of torque tube 17. In the form shown, member 25 is square or other than round and is received in a mating aperture in tip member 16.

Cage bearing base 34 may have a shank 35 adjustably mounted in cage bearing holding assembly 42. In the form shown, assembly 42 may comprise flanges 36 and 37, flange 36 being held on flange 37 of casing 28 by bolts 38. Shank 35 may have a threaded portion 39 and nut 40 for adjustably holding the same on the cage bearing.

Tip 16 and base 34 are joined by longitudinally extending spring-like flexure members 43. Preferably, the flexure members 43 are flat and their sides extend radially outward relative to the axis of rotation resisting member 15.

In operation, as the displacement member 10 is moved by changes in liquid level, tip 16 will be rotated relative to the axis of the torque tube 17 and rod 21, torque tube 17 twisting in response to torque exerted thereon. Rod 21 will be rotated thereby and will operate the indicator or controller mechanism to produce a signal. Rotation of tip 16 is resisted by cage bearing flexure members 43. The desired force and adjustment of the arrangement can be made by turning shank 35, arm 44 (Fig. 4) being attached to the shank to facilitate the turning. Locking nut 45 can be used to lock arm 44 in its adjusted position.

In Fig. 5, the tip 16 and base 34 are shown in twisted relationship, the socket 14 being omitted.

The cage bearing may be made of any suitable metal such as steel, bronze or other metal chosen in accordance with the atmosphere to which it is to be exposed. The spring rate and rigidity can be changed in accordance with the material chosen or the number of flexure strips.

In the form illustrated in Figs. 1 and 3, the separated flexure members 43 are held in appropriate slots in base 34 and tip 16, the flexure members being suitably held therein by welding or the like.

An alternative form of cage bearing flexure strut is seen in Fig. 8 where the flexure cage bearing members can be formed by slitting a tube 45 and then bending edges 46 and 47 outwardly and inwardly to form a strut, the cage bearing being an integral structure.

In the event of misalignment, the Oldham or slider coupling seen in Fig. 6 can be used in place of the arrangement of Fig. 3. Tip 46 may have flexure members 47 carried therein similar to tip 16 of Figs. 2 and 3. Slot 48 is formed therein to receive projection 49 of intermediate disc 50. The end of the torque tube 51 may have a plate 52 with a slot 53 therein, slot 53 receiving projection 54 of disc 50.

In the alternate form of the invention seen in Fig. 7, the cage bearing assembly 55 surrounds the torque tube 56, torque tube 56 being connected to tip 57 of the cage bearing by means of head 58 engaging aperture 59 of tip 57. Actuating arm 60 is connected to an operating mechanism similar to the previously described embodiments. Flexure members 61 are fastened to tip 57 and to base member 62, base 62 being adjustably held between casing 63 and flange 64. The indicating or controlling means casing 65 can be fastened to flange 64, rod 66 extending therein for operating the indicator or controller. The torque tube 56 is positively joined to socket 67 mounted in base member 62 and held in place by threaded bushing 68. Thus, it can be seen that the cage bearing at least partially surrounds the torque tube, the anchor location of the cage bearing being spaced from the connection of its tip with the torque tube and rod.

In another form (not shown), the torque tube and rod could be replaced with a solid shaft extending through the casing, the cage bearing being fastened to the solid shaft. The cage bearing may have a generally cylindrical form or may be conical in form as shown in the drawings.

It should be apparent that variations can be made in the details of the aforementioned structure without departing from the spirit of the invention except as defined in the appended claims.

What is claimed is:

1. In an instrument actuating mechanism having operating means, the combination including a torque tube anchored adjacent one end thereof, a shaft extending through said tube and fastened thereto at a location spaced from the anchored end of said tube, and a resilient motion resisting and supporting means connected to said tube at a location spaced from the anchored end of said tube, said motion resisting means being anchored at one of its ends and having longitudinally extending separated elements between its anchored end and its connection with the tube, whereby rotation of said tube by said operating means is resisted and said tube is at least partially supported thereby.

2. In an instrument actuating mechanism having operating means, the combination including a torque tube anchored adjacent one end thereof, a rod extending through said tube and fastened thereto at a location spaced from the anchored end of said tube, and a resilient motion resisting cage means connected to said tube at a location spaced from the anchored end of said tube, said motion resisting means having an anchored base member and having longitudinally extending separated flexure elements between said base member and its connection with the tube, whereby rotation of the tube is resisted and said connection with the tube is at least partially supported thereby.

3. In an instrument actuating mechanism having operating means, the combination including a torque tube anchored adjacent one end thereof, a rod extending through said tube and fastened thereto at a location spaced from the anchored end of said tube, and a resilient motion resisting cage means connected to said tube at a location spaced from the anchored end of said tube, said motion resisting means having an anchored base member and having longitudinally extending separated radial flexure elements between said base member and its connection with the tube, whereby rotation of the tube is resisted and said connection with the tube is at least partially supported thereby.

4. In an instrument actuating mechanism having a movable operating means, the combination including a torque tube having a portion anchored to frame means adjacent one of the ends of said tube, a rod extending through said tube and fastened to said tube at a location spaced from the anchored portion of the tube, a cage bearing means connected to said tube by a tip means at a location spaced from the anchored end of said tube, said cage bearing means having an anchored base member with longitudinally extending separated flexure elements between said base member and said tip member and means for adjustably holding said base.

5. In an instrument actuating mechanism having a movable operating means, the combination including a torque tube having a portion anchored to frame means adjacent one of the ends of said tube, a rod extending through said tube and fastened to said tube at a location spaced from the anchored portion of the tube, a cage bearing means connected to said tube by a tip member at a location spaced from the anchored end of said tube, said cage bearing means having an anchored base member with longitudinally extending separated flexure elements between said base member and said tip member, said flexure elements being flat strips extending radially relative to the axis of the cage bearing member, and means for adjustably holding said base.

6. In an instrument actuating mechanism having a movable operating means, the combination including a torque tube having a portion anchored to frame means adjacent one of the ends of said tube, a rod extending through said tube and fastened to said tube at a location spaced from the anchored portion of the tube, cage bearing means connected to said tube by a tip member at a location spaced from the anchored end of said tube, said cage bearing means having an anchored base member with longitudinally extending separated flexure elements between said base and said tip member, the connection to the tip member being an Oldham coupling, and means for adjustably holding said base.

7. In an instrument actuating mechanism having a movable operating means, the combination including a torque tube positively anchored to a frame means adjacent one of the ends of said tube, a motion transmitting rod extending through said tube and fastened to said tube at a location spaced from the anchored portion of the tube, cage bearing means connected to said tube by a tip member at a location spaced from the anchored end of said tube, said cage means having a base member anchor spaced from said tip member by a plurality of means anchoring said base member in a location surrounding said torque tube, and means for adjusting said base.

8. In an instrument actuating mechanism having a condition responsive operating means, the combination including a torque tube anchored adjacent one end thereof, a shaft extending through said tube and fastened thereto at a location spaced from the anchored end of the tube, cage bearing means, said cage bearing means having longitudinally extending flexure elements providing for twisting of the ends of the bearing means when subjected to torsional force, means connecting an end portion of said bearing means to said torque tube at a location spaced from the anchored end of the torque tube means connecting said bearing means to said operating means, and means anchoring an end portion of said bearing meas spaced from the conection of the operating means thereto.

9. In an instrument actuating mechanism having a condition responsive operating means, the combination of means rotatable by said operating means for producing a signal, cage bearing means, said cage bearing means having longitudinally extending flexure elements providing for twisting of the ends of the bearing means when subjected to torsional force, means connecting an end portion of said bearing means to said means rotatable by said operating means, means operatively connecting said bearing means to said operating means, means anchoring an end portion of said bearing means spaced from the connection of the operating means thereto, and means for angularly adjusting the means anchoring said last mentioned end portion.

10. In an instrument actuating mechanism, the combination including a torque tube having socket means for anchoring one end, a rod extending through said tube and fastened thereto at a location spaced from the socket means, and a resilient motion resisting cage means connected to said tube at a location spaced from the socket means, said motion resisting means having a base member adapted to be anchored and having longitudinally extending separated flexure elements between said base member and its connection with the tube.

11. In an instrument actuating mechanism, the combination including a torque tube having socket means for anchoring one end, a rod extending through said tube and fastened thereto at a location spaced from the socket means, and a resilient motion resisting cage means connected to said tube at a location spaced from the socket means, said motion resisting means having a base member adapted to be anchored and having longitudinally extending separated flexure elements between said base member and its connection with the tube, said base member having means for holding said socket.

References Cited in the file of this patent

UNITED STATES PATENTS

| | | |
|---|---|---|
| 2,248,322 | Annin | July 8, 1941 |
| 2,365,573 | McGay | Dec. 19, 1944 |
| 2,514,059 | Hicks | July 4, 1950 |
| 2,557,542 | Kapitza | June 19, 1951 |
| 2,625,820 | Whitehead | Jan. 20, 1953 |

FOREIGN PATENTS

| | | |
|---|---|---|
| 218,114 | Great Britain | July 3, 1924 |